United States Patent [19]

Nakhle et al.

[11] 4,312,608
[45] Jan. 26, 1982

[54] TRAP GATE VALVE ASSEMBLY

[75] Inventors: George D. Nakhle; Cecil R. Bell, Jr., both of Pinnacle, N.C.

[73] Assignee: Consolidated Foods Corporation, Winston-Salem, N.C.

[21] Appl. No.: 128,927

[22] Filed: Mar. 10, 1980

[51] Int. Cl.³ .............................................. B65G 53/60
[52] U.S. Cl. .................................. 406/171; 66/149 S; 406/36
[58] Field of Search .............. 406/12, 21, 22, 23, 406/36, 168, 171, 172, 173, 192; 66/149 S

[56] References Cited

U.S. PATENT DOCUMENTS

| | | | |
|---|---|---|---|
| 2,940,795 | 6/1960 | Peters | 406/171 X |
| 2,995,914 | 8/1961 | Imboden | 66/149 S |
| 3,392,551 | 7/1968 | Tenconi | |
| 3,423,130 | 1/1969 | Milner | 406/168 X |
| 3,429,618 | 2/1969 | Sparso et al. | |
| 3,517,529 | 6/1970 | Currier | |
| 3,858,417 | 1/1975 | Uhlir et al. | 66/149 S |

FOREIGN PATENT DOCUMENTS 2505984  9/1976  Fed. Rep. of Germany ...... 406/171

Primary Examiner—Jeffrey V. Nase
Attorney, Agent, or Firm—Charles Y. Lackey; William S. Burden

[57] ABSTRACT

A portable, compact, unitized device for transferring articles by pneumatic means from a processing machine to a collection receptacle includes a chamber divided into two compartments by a perforated plate, and having a releasable closure cap at one end and a trap door at the opposite end. A port in one compartment is coupled to a vacuum source, and a work inlet port in the other compartment communicates with a work processing means. An actuator, completely encompassed within one compartment and mounted upon the releasable closure, includes a shutter moveable axially of the vaccum source port for controlling air flow through the compartments.

10 Claims, 4 Drawing Figures

TRAP GATE VALVE ASSEMBLY

BACKGROUND, BRIEF SUMMARY AND OBJECTS OF THE INVENTION

The present invention relates to a new and improved trap gate valve assembly for transferring work, such as hosiery articles, from a work processing machine to an article collection receptacle or other receiving assembly. The invention will be described in conjunction with the transfer of hosiery articles from knitting, sewing and inspection machines to a collection area, it is to be understood that the invention may also be utilized when transferring pneumatically various articles or components from one location to another.

Numerous devices have been utilized in conjunction with knitting machines for pneumatically conveying an article from a machine to a collection point, as taught by U.S. Pat. Nos. 3,858,417 to Uhlir et al; 2,995,914 to Imboden; and 3,517,529 to Currier. However, these prior devices involve a number of closure valves or flaps positioned within various pneumatic tubes or housings at locations remote to an article collection chamber or basket. Such devices require considerable space, are relatively complicated and expensive, and create problems due to their remote locations when the valves or valve actuators are to be repaired or replaced.

Applicant's invention is simple in design and operation and the space requirements are limited to a minimum. The compact, unitized device can be easily and economically applied to existing work processing machines. Briefly, in one embodiment of applicants invention, a housing is divided into two compartments by a perforated wall, one compartment being in communication with a vacuum source and the second compartment being in communication with a work processing machine. The housing lower end is provided with a door biased to the closed position by a weight and which is capable of automatically opening to discharge an article from the second compartment due to the weight of the article upon termination of air flow through the second compartment. The housing upper end is closed by a removable cap member which supports a shutter and shutter actuator completely within the compartment communicating with the vacuum source. Replacement or maintenance to the shutter and/or shutter actuator can be readily accomplished merely by removing the housing end cap, and replacement of the entire unit maybe easily completed by disconnecting the unit from the two conduits communicating with a vacuum source and the work processing machine.

One of the primary objects of the invention is the provision of new and improved, lightweight, gate trap valve assembly which is of simple, economical, compact construction, and which is easy to maintain.

Another object of the invention is the provision of an apparatus which is reliable in operation, and which may be easily and economically applied to existing work processing machines.

Other features and advantages of the invention will become apparent to those skilled in the art during the course of the following detailed description of the invention.

DETAILED DESCRIPTION OF THE INVENTION

Figure 1:
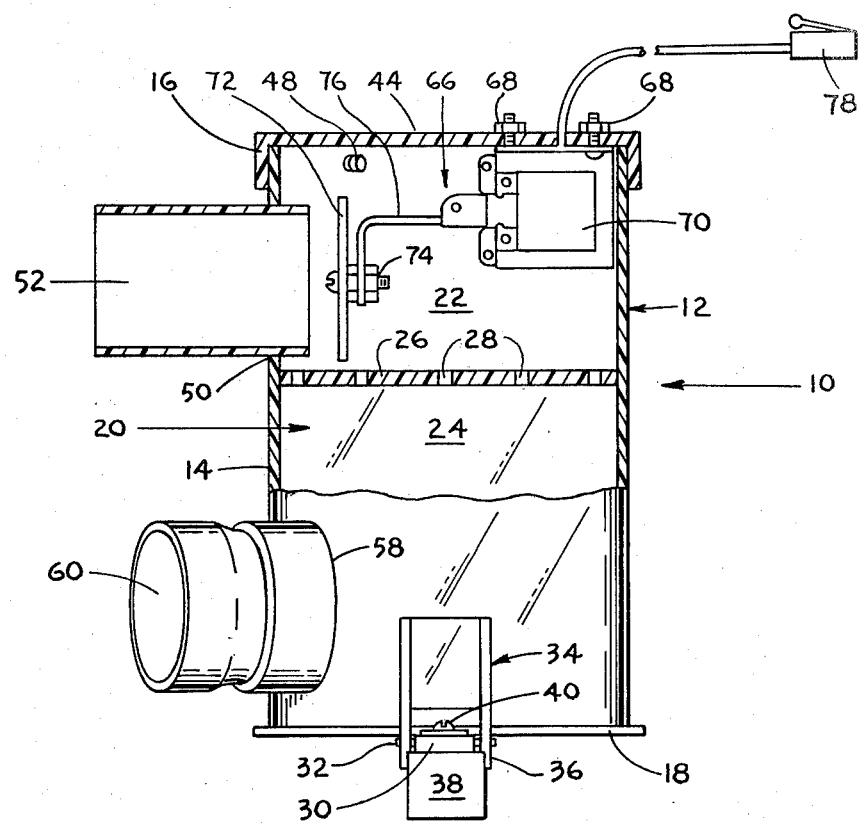
FIG. 1 is a side elevational view of the gate trap valve assembly of the present invention with parts shown in section.
Figure 3:
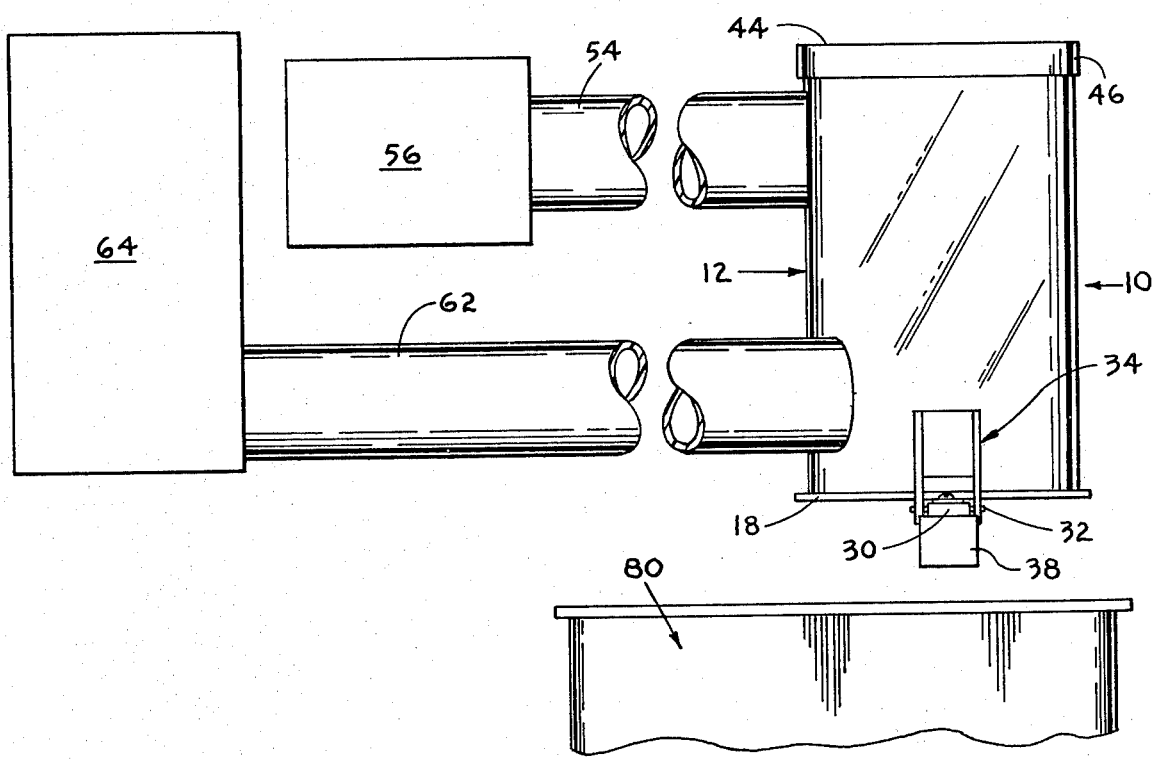
FIG. 3 is a schematic view of the trap gate valve assembly of the present invention associated with a vacuum source, a work processing machine and a work receptacle.

Referring to the drawing, and particularly to FIGS. 1 and 3, the gate trap valve assembly 10 includes a housing 12 having a cylindrical side wall 14, a upper closure member or cap 16, and the lower closure member or door 18.

The housing defines a chamber 20 which is divided into separate compartments 22 and 24 by a perforated partition 26 which is supported by the housing side wall 14. In the embodiment illustrated, the compartments 22, 24 are in superposed relation and the partition is in the form of a disk, secured to the inner periphery of the wall 14, which is provided with a series of openings 28 therethrough.

The lower closure member 18 consists of a plate which extends outwardly of the side wall 14. In the embodiment illustrated, the member 18 is in the form of a disk having a diameter greater than the outer diameter of the annular side wall 14, so as to completely close the lower end of housing 12.

The disk 18 is secured to an elongated arm 30 which, in turn, is pivotally supported by a pin 32 upon a generally U-shaped bracket 34 having depending spaced leg portions 36. The pin 32 extends through the arm 30 and into the spaced leg portions 36 at a location axially and radially outwardly of the cylindrical side wall 14, as shown by FIG. 1, such that when the arm 30 is substantially perpendicular to the annular wall 14, the closure member 18 is in abutting relation with the end of annular wall 14. A counterweight 38 is adjustably positioned along the outer end of arm 30 by a releasable fastener 40 which extends through a slot 42. The weight 38 is adjustably positioned such that the closure member 18 is maintained in a closed position, as shown by the drawing.

The upper closure member or cap 16 has a disk-like portion 44 integral with an annular wall portion 46 which overlaps and extends axially of the cylindrical wall 14. The fastener 48 extends through an opening in wall portion 46 and engages the wall 14 to retain the cap 16 upon the wall 14.

A port 50 is provided in the annular wall 14 and a duct 52 extends through the port and into compartment 22. The duct, which is secured to the housing wall 14, is adapted to be coupled to a conduit 54, in a conventional manner, for communication with a suitable vacuum source 56. A second port 58 in wall 14 receives a second duct 60 which serves as a seat for a conduit 62. The conduit 62 and duct 60 provide communication between the work receiving compartment 24 and the housing 12 and a work processing machine 64.

A closure assembly 66 is secured to the cap 16 by fasteners 68 and is completely housed within the compartment 22. In the FIG. 1 embodiment, the closure assembly includes a solenoid actuator 70 having a disk-like shutter 72 secured to the outer end of the core member 76 by fastener 74. The solenoid moves the shutter axially of the duct 52 between a position spaced from the end of the duct, as in FIG. 1 and a position in abutting, sealing engagement with the end of duct 52, therefore serving as a valve for selectively controlling air flow through the compartments 22, 24.

The solenoid may be energized by a switch 78. The switch may be selectively actuated by a machine operator, or the switch may be automatically actuated by a control apparatus. For example, if the trap gate valve assembly is utilized with a knitting machine, the switch 78 could be controlled by a conventional pattern control means.

In the operation of the apparatus, the vacuum source 56 continuously operates to create a suction in conduit 52. It is to be noted that the vacuum source 56 may communicate through conduits connected with a plurality of trap gate valve assemblies for transferring articles from a number of processings means to collection receptacles.

Figure 2:
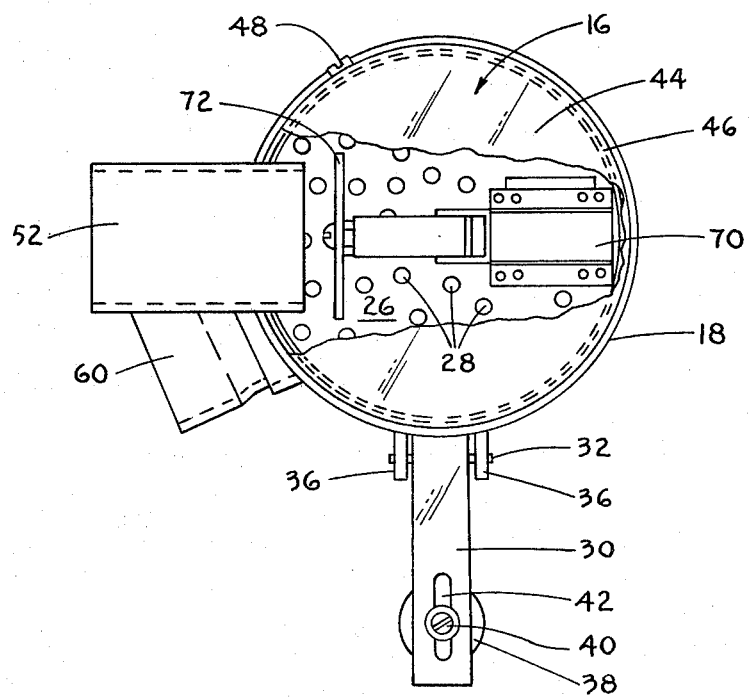
FIG. 2 is a top plan view of the assembly with parts broken away.

Normally the shutter 72 is in the closed position abutting the end of duct 52, the solenoid is de-energized, and the lower door 18 is maintained closed by the counterweight 38. Suction in the conduit 54 and duct 52 would tend to urge the shutter 72 tighter against the end of the duct and interrupt air flow through the chamber 20. When a work product, such as a hosiery blank or article is to be removed from the work processing machine 64, the switch 78 may be either manually operated or automatically operated to energize the solenoid 70 for a predetermined time interval. When the solenoid moves the shutter 72 to the position of FIGS. 1 and 2, air flow is created through conduit 62, the lower compartment 24, the perforated partition 26, the upper compartment 22 and through conduit 54. Therefore, a work article is removed from the machine 64 and drawn through the conduit 62 and into the compartment 24 and upwardly where it abutts the partition 24. Upon de-energization of the solenoid after a predetermined time interval, the shutter moves to the closed position sealing the end of duct 52 and interrupting air flow through the housing 12. The work article in the compartment 24 falls by gravity upon the lower closure member 18, and the weight of the article is sufficient to overcome the counterweight 38 and pivot the closure member 18 to the open position for permitting the article to drop to a receiving means or receptacle 80 located beneath the housing 12.

Preferably, the conduits 54, 62, ducts 52, 60 housing side wall 14, partition 26, upper end wall 44 and lower wall 18 are formed of clear plastic material so that an operator may easily detect the presence of work articles.

Figure 4:
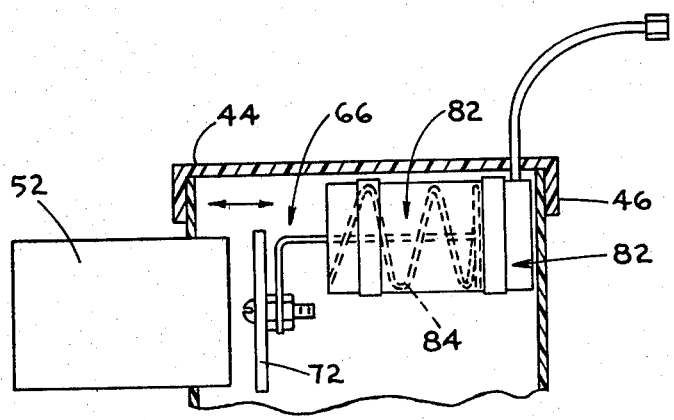
FIG. 4 is a schematic, fragmentary view of the gate trap valve assembly illustrating a modified closure actuator.

FIG. 4 illustrates a modified closure means 66 which utilizes a fluid cylinder 82 to displace the shutter 72 axially of the duct 52 between open and closed positions. Movement of the shutter in one direction is accomplished by fluid pressure in the cylinder while movement in the opposite direction is accomplished by a spring 84 within the cylinder. The fluid cylinder preferably is secured to the removable cap 44 by conventional fasteners.

What is claimed is:

1. A trap gate valve assembly for pneumatically transferring work articles from a work processing machine to a receiving apparatus comprising a housing defining a cylindrical chamber, said housing including a generally vertically disposed annular side wall, a removable upper end wall closing one end of the cylindrical chamber and lower end wall closing the end of the chamber opposite said one end, means releasably coupling said upper end wall to said annular side wall, means for pivotably supporting said lower end wall relative to said annular wall and for normally retaining said lower end wall in abutting relation with said annular side wall to close said chamber, perforated wall means within said housing and extending transversely of said chamber for dividing said chamber into first and second compartments, first duct means defining a first port in said annular side wall for permitting the transfer of work articles from a work processing machine into said first compartment, second duct means defining a second port in said annular side wall for providing communication between said second compartment and a vacuum source, closure means completely encompassed within said second compartment and cooperating with said second duct means for selectively opening said second port to control the flow of air through said chamber to transfer a work article to said first compartment, and for closing said second port to interrupt air flow thus discharging the article from said first compartment to a receiving apparatus.

2. Apparatus as recited in claim 1, wherein said closure means includes an actuator for displacing a shutter axially of said second duct means between an open position and a closed position in abutting relation with said second duct means, and wherein said first and second compartments are in superposed relation.

3. Apparatus as recited in claim 1, wherein said means for pivotably supporting said lower end wall relative to said annular wall and for normally retaining said lower end wall in abutting relation with said annular wall includes an arm secured to said lower end wall and a counterweight adjustably positioned along said arm to normally close said first compartment.

4. Apparatus as recited in claim 1, wherein said closure means includes a solenoid and a shutter member displaceable by said solenoid, and means for securing said closure means to said upper end wall.

5. Apparatus as recited in claim 1, wherein said closure means includes a fluid cylinder and a shutter member displaceable by said cylinder, said shutter being aligned with said second duct means defining said second port.

6. Apparatus as recited in claim 1, said means for pivotably supporting said lower end wall relative to said annular side wall and for normally retaining said lower end wall in abutting relating with said annular side wall including a bracket secured to said annular side wall, elongated lever, a pin pivotably supporting said lever upon said bracket, a weight supported by said elongated lever, and means for selectively positioning said weight along said lever, and means mounting said lower end wall upon said elongated lever.

7. Apparatus as recited in claim 1, wherein said annular side wall, said removable upper end wall, and said lower end wall are formed of clear plastic material.

8. A trap gate valve assembly comprising a housing having a vertically disposed annular side wall defining a generally vertically disposed cylindrical chamber, a removable upper end cap closing one end of said cylindrical chamber, fastener means releasably coupling said end cap to said annular side wall, a door provided at the other end of said chamber, means mounted upon said housing for pivotably supporting said door, and counterweight means for normally maintaining said door in a closed position, a generally horizontally disposed perforated wall means extending transversely of said chamber and secured to the inner peripheral portions of said annular side wall for dividing said chamber into first and second superposed compartments, a first means provided in said annular side wall defining a first port for delivering articles therethrough, a second means in said annular side wall defining a second port for communicating with said second compartment to remove air through said perforated wall means and from said chamber to create a vacuum, actuator means secured to said end cap and completely encompassed in said second compartment by said annular side wall, said end cap and said perforated disk, said actuator means including a shutter displaceable within said second compartment to open or close said second port.

9. Apparatus as recited in claim 8, wherein said end cap and said annular side wall are formed of clear plastic.

10. Apparatus as recited in claim 8, wherein said actuator means comprises a fluid cylinder releasably secured to said end cap.

* * * * *